United States Patent [19]

Hall

[11] Patent Number: 4,904,985
[45] Date of Patent: Feb. 27, 1990

[54] MOLE DETECTOR APPARATUS

[76] Inventor: Lendel D. Hall, 16840 S. Memorial, Bixby, Okla. 74008

[21] Appl. No.: 295,141

[22] Filed: Jan. 9, 1989

[51] Int. Cl.⁴ .............................................. G08B 21/00
[52] U.S. Cl. .......................................... 340/573; 43/1; 340/540
[58] Field of Search .................... 340/573, 540; 43/58, 43/64–77

[56] References Cited

U.S. PATENT DOCUMENTS

| | | | |
|---|---|---|---|
| 4,038,639 | 7/1977 | Kuebler | 340/573 |
| 4,188,622 | 2/1980 | Miller et al. | 340/573 |
| 4,196,429 | 4/1980 | Davis | 340/573 |
| 4,408,193 | 10/1983 | Millen | 340/573 |
| 4,686,504 | 8/1987 | German | 340/573 |

Primary Examiner—Glen R. Swann, III
Attorney, Agent, or Firm—Leon Gilden

[57] ABSTRACT

A framework is positioned overlying a mole burrow or passageway and supports a pivotally mounted, non-conductive plate carrying a conductor to complete a circuit to actuate a remote alarm during passage of a mole in the burrow, which thereby raises the conductor to touch a contact and actuate the alarm.

8 Claims, 1 Drawing Sheet

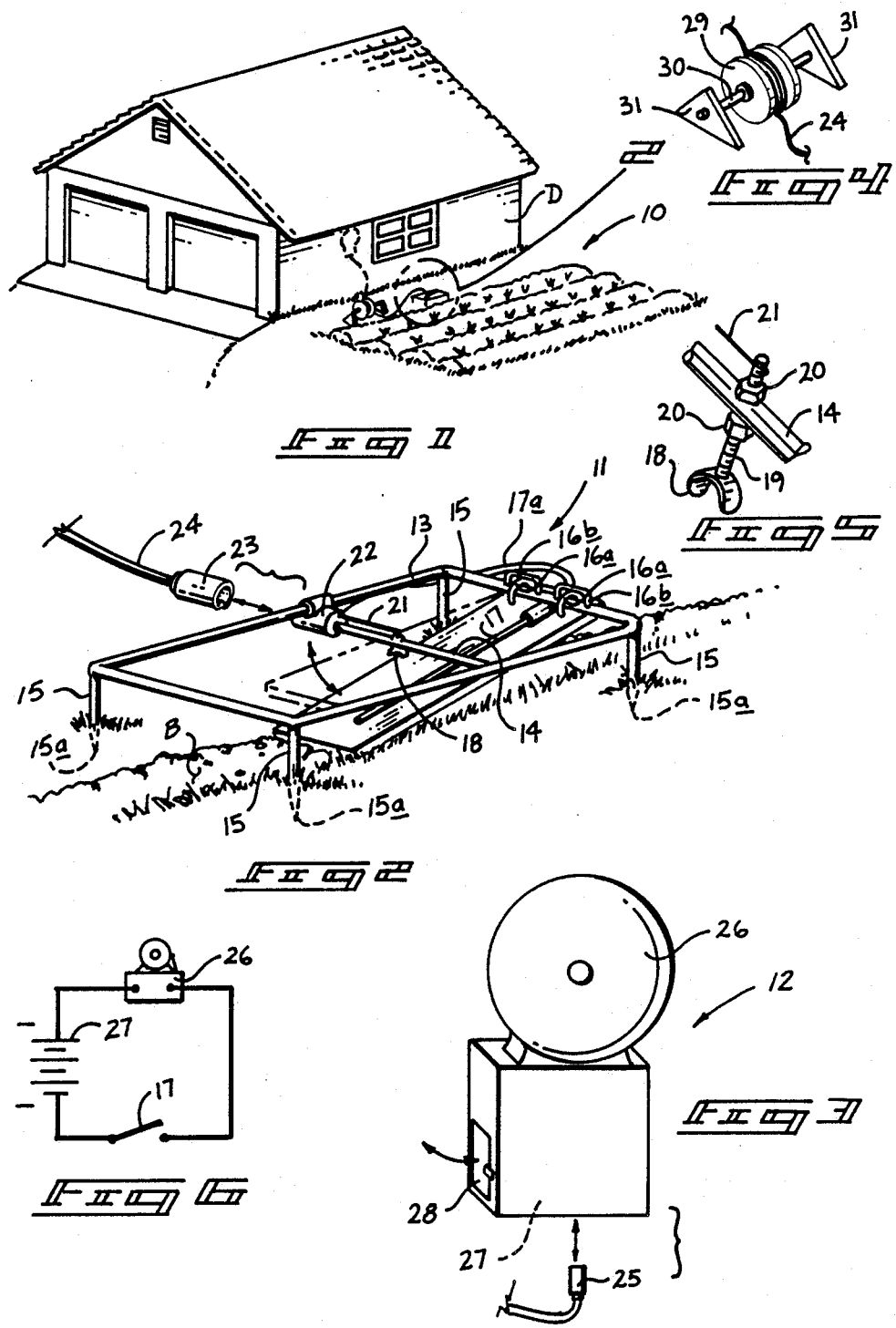

MOLE DETECTOR APPARATUS

BACKGROUND OF THE INVENTION

1. Field of the Invention

The field of invention relates to animal detection devices, and more particularly pertains to a new and improved mole detector apparatus wherein the same is positioned overlying a mole passageway for detecting the presence of a mole passing therethrough to enable capture and disposal of the mole.

2. Description of the Prior Art

The use of various alarm devices to detect the presence or absence of associated animals is well known in the prior art. Previously the use of mole detector apparatus has heretofore not been adequately addressed by the prior art to detect the presence of a mole. As is understood, this category of rodent is particularly elusive due to its subterranean habitat. Examples of prior devices for detection of animals and the like is exemplified in U.S. Pat. No. 4,038,629 to Kuebler setting forth a bird perch alarm whereupon the alighting of a bird upon an overlying perch, a downwardly depending rod actuates a switch to indicate the positioning of a bird in response to the bird's weight upon the perch. The Kuebler patent is of interest relative to the notion of detection of a mammal with an audible alarm associated therewith.

U.S. Pat. No. 4,188,622 to Miller sets forth a garbage can alarm wherein an alarm mechanism is circumferentially securable about the exterior surface of a garbage can whereupon a dog or the like tampering with the garbage can actuates the alarm to signal the event. The Miller patent is of a relatively remote organization to that of the instant invention, but is of interest relative to the further notion in the prior art to detect the presence of an animal in a particular environment. U.S. Pat. No. 4,196,429 to Davis sets forth a motion detector for use particularly in an automotive environment to detect unwarranted tampering with the automobile. The Davis patent is of interest relative to a further example of an alarm actuatable in response to an event to be detected.

U.S. Pat. No. 4,408,193 to Millen sets forth a wave detector for use in combination with swimming pools wherein the alarm is floatably mounted upon the upper surface of a swimming pool and the like to detect the presence of waves and effect an alert in response thereto.

U.S. Pat. No. 4,686,504 to German sets forth an audible alarm which is actuatable by a pet to enable that pet to signal the desire to enter or depart a dwelling in response to pressure of the pet onto an associated pivotally mounted switch.

As such, it may be appreciated that there is a continuing need for a new and improved mole detector apparatus wherein the same addresses both the problems of effectiveness and ease of use, and in this respect the present invention substantially fulfills this need.

SUMMARY OF THE INVENTION

In view of the foregoing disadvantages inherent in the known types of detection apparatus now present in the prior art, the present invention provides a mole detection apparatus wherein the same may be readily positioned during periods of use and may be manipulated about a desired area to effect actuation of the alarm in response to traverse of a mole through an associated burrow. As such, the general purpose of the present invention, which will be described subsequently in greater detail, is to provide a new and improved mole detection apparatus which has all the advantages of the prior art detection apparatus and none of the disadvantages.

To attain this, the present invention comprises a framework including a plurality of downwardly depending legs to position the framework overlying a mole burrow or passageway with a pivotally mounted lever responsive to traverse of the mole through the aforenoted passageway. Repositioning of the switch actuates an audible alarm remotely mounted relative to the switch apparatus to provide a user thereof ample time to effect remedial action to dispose or capture the associated mole.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. there are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mole detection apparatus which has all the advantages of the prior art detection apparatus and none of the disadvantages.

It is another object of the present invention to provide a new and improved mole detection apparatus which may be easily and efficiently manufactured and marketed.

It is a further object of the present invention to provide a new and improved mole detection apparatus which is of a durable and reliable construction.

An even further object of the present invention is to provide a new and improved mole detection apparatus which is susceptible of a low cost of manufacture with regard to both materials and labor, and which accordingly is then susceptible of low prices of sale to the consuming public, thereby making such mole detection apparatus economically available to the buying public.

Still yet another object of the present invention is to provide a new and improved mole detection apparatus which provides in the apparatuses and methods of the prior art some of the advantages thereof, while simultaneously overcoming some of the disadvantages normally associated therewith.

Still another object of the present invention is to provide a new and improved mole detection apparatus wherein a framework, including a switch, is mounted relative to a mole passageway to actuate an audible alarm to indicate presence of the mole passing therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the apparatus positioned in a working environment.

FIG. 2 is an isometric illustration, somewhat enlarged, of the apparatus as indicated in portion 2 of FIG. 1.

FIG. 3 is an isometric illustration of the audible alarm mechanism.

FIG. 4 is an isometric illustration of the reel device utilized to secure the length of the associated electrical cable.

FIG. 5 is an isometric illustrations, somewhat expanded, of the adjustably mounted contact member of the instant invention.

FIG. 6 is a diagrammatic representation of the electrical circuit of the instant invention.

DESCRIPTION OF THE PREFERRED EMBODIMENT

With reference now to the drawings, and in particular to FIGS. 1 to 6 thereof, a new and improved mole detection apparatus embodying the principles and concepts of the present invention and generally designated by the reference numeral 10 will be described.

More specifically, the mole detector apparatus 10 essentially comprises a switch mechanism 11 (FIG. 2) associated electrically with an audible alarm 12 (FIG. 3). The switch mechanism 11 comprises a rectangular horizontal framework overlying a passageway of burrow "B" of an associated mole. The framework 13 includes a horizontal cross member 14 positioned somewhat medially of the framework and a plurality of downwardly extending legs 15 formed with sharpened ends 15a to enhance ease of insertion into the ground about the burrow "B" to align a non-conductive lever 16 with the burrow. The non-conductive lever may be formed of any suitable polymeric or cellular material as is economically deemed appropriate. The lever 16 includes a plurality of "U" shaped pivot yokes 16a positioned proximate one end of the lever for securement about the framework 13 in a pivoting relationship with a positioning yoke 16b extending in an overlying position relative to one or both of the pivot yokes 16a to maintain the lever 16 in a predetermined orientation relative to the framework 13. A bare or uncovered contact wire 17 extends from the insulative sheathing of a first conductive wire 17a extending from an electrical junction 22 secured to the framework 13. The first conductive wire extends along the upper surface of the lever 16 and is mounted for contact with a downwardly extending "U" shaped contact yoke 18 formed, as best seen in FIG. 5, with a threaded shaft 19 and a plurality of securement nuts 20 on either side of the cross member 14 to vertically reposition the yoke 18 as desired dependent upon the degree of "free travel" desired of the lever 16 prior to contact. A second conductive wire 21 extends from the shaft 19 to the electrical junction and associates therewith with a first electrical quick disconnect connector 23 of conventional construction. A third conductive wire 24 electrically associates the first electrical connector 23 to a second electrical connector 25 which is received within the audible alarm 12 (FIG. 3).

The audible alarm 12 includes a bell alarm 26 with a battery 27 replaceably mounted within an underlying housing of the bell alarm 26. An access door 28 within the housing enables replacement of the battery 27 as is necessary. It is understood that the battery 27 may be replaced by a direct current transformer if desired.

As seen in FIG. 4, a spool 29 secures the third conductive wire 24 thereabout and is rotatably mounted along the horizontal axis 30 which is in turn mounted to a plurality of supports 31. The spool 29 enables additional length of the third conductive wire 24 to be utilized and thereby enables positioning of the switch mechanism 11 at remote positions relative to the associated audible alarm 12.

As to the manner of usage and operation therefore of the instant invention, the same should be apparent from the above description. During traverse of a mole through its associated burrow "B", the lever 16 is pivoted upwardly, as illustrated in FIG. 2 in phantom, to enable electrical association of the contact wire 17 with the yoke 18 to actuate the bell alarm 26 indicating presence of a mole to enable a user of the apparatus to effect capture or destruction of the rodent.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mole detection apparatus for positioning in overlying relationship to a burrow, comprising,
   a framework means for straddling and overlying said burrow, and a switch pivotally mounted to said framework means pivotal from a first lower position to a second raised position relative to said framework, and an audible alarm remotely mounted relative to said framework for actuation upon said switch's pivoting to said second raised position for indication of a mole in said burrow.

2. A mole detection apparatus as set forth in claim 1 wherein said framework means includes a horizontal framework matrix including a cross member medially positioned thereof with a plurality of downwardly depending legs from said horizontal framework for securement about said burrow with said legs each formed with a pointed lowermost terminal end.

3. A mole detection apparatus as set forth in claim 2 wherein said cross member includes an electrical junction, and said electrical junction includes a first conductive wire extending from said junction to an upper terminal end of said switch, and said switch comprises an elongate non-conductive planar lever with a non-insulated conductive contact wire extending from said electrical junction along said lever.

4. A mole detection apparatus as set forth in claim 3 wherein said cross member further includes a downwardly extending vertically adjustable yoke positioned for contact with said contact wire upon said switch's pivoting to said second raised position, and a second conductive wire extending from said yoke to said junction.

5. A mole detection apparatus as set forth in claim 4 wherein a quick-disconnect electrical connector is selectively securable to said junction with a further quick-disconnect electrical connector selectively securable to said audible alarm with said first and second connectors electrically associated with a third conductive wire therebetween.

6. A mole detection apparatus as set forth in claim 5 wherein a spool secures said third conductive wire thereabout for storage thereof between said audible alarm and said switch.

7. A mole detection apparatus as set forth in claim 6 wherein said lever includes a plurality of "U" shaped yokes capturing said horizontal framework between said yokes and said lever and including at least one positioning yoke overlying one of said U-shaped yokes for maintaining said lever in a predetermined position relative to said horizontal framework.

8. A mole detection apparatus as set forth in claim 7 wherein said audible alarm includes an underlying housing with a replaceable battery positioned therewithin for providing electrical energy to actuate said audible alarm.

* * * * *